(12) United States Patent
Seeds et al.

(10) Patent No.: US 7,559,404 B2
(45) Date of Patent: Jul. 14, 2009

(54) MODULAR AXLE ASSEMBLY AND METHOD

(75) Inventors: Harold W. Seeds, Waterford, MI (US); David M. Morse, Louisville, OH (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 11/818,259

(22) Filed: Jun. 13, 2007

(65) Prior Publication Data

US 2007/0241609 A1 Oct. 18, 2007

Related U.S. Application Data

(63) Continuation of application No. 10/792,661, filed on Mar. 3, 2004.

(60) Provisional application No. 60/512,232, filed on Oct. 17, 2003.

(51) Int. Cl.
*B60K 17/16* (2006.01)

(52) U.S. Cl. .................................. 180/378; 301/124.1

(58) Field of Classification Search ................. 180/905, 180/906, 378–380; 301/124.1, 131, 137; 74/607

See application file for complete search history.

(56) References Cited

U.S. PATENT DOCUMENTS

| | | | |
|---|---|---|---|
| 1,732,825 A | 10/1929 | Wilson | |
| 2,570,191 A | 10/1951 | Beckwith | |
| 2,911,262 A | 11/1959 | Franckj | |
| 3,037,818 A | 6/1962 | Scheel | |
| 4,168,086 A * | 9/1979 | Dick et al. | 280/124.1 |
| 4,284,158 A | 8/1981 | Schield | |
| 4,815,338 A | 3/1989 | Holan et al. | |
| 5,105,517 A | 4/1992 | Barnow | |
| 5,429,423 A | 7/1995 | Pollock et al. | |
| 5,664,847 A * | 9/1997 | Bear et al. | 301/137 |
| 5,810,377 A | 9/1998 | Keeler et al. | |
| 6,024,418 A | 2/2000 | Ebert | |
| 6,253,989 B1 * | 7/2001 | Bennett | 228/135 |
| 6,439,672 B1 | 8/2002 | Simon | |

* cited by examiner

*Primary Examiner*—Faye M. Fleming
(74) *Attorney, Agent, or Firm*—Harness, Dickey & Pierce, P.L.C.

(57) ABSTRACT

A modular axle assembly includes a first tube assembly and a second tube assembly interconnected by a center section. A number of different modular axle assemblies are constructed by using different center sections. For example, a non-driving axle includes a sleeve interconnecting first and second tube assemblies. A driving front axle includes a differential housing interconnecting the first and second tube assemblies.

14 Claims, 4 Drawing Sheets

MODULAR AXLE ASSEMBLY AND METHOD

CROSS-REFERENCE TO RELATED APPLICATIONS

This application is a divisional of U.S. patent application Ser. No. 10/792,661 filed on Mar. 3, 2004, which claims the benefit of U.S. Provisional Application No. 60/512,232 filed on Oct. 17, 2003. The disclosures of the above applications are incorporated herein by reference.

The present invention relates generally to axle assemblies for motor vehicles and, more particularly, to a family of modular axle assemblies which include a majority of common components.

In view of an increased demand for vehicles having all wheel drive systems, many manufacturers are currently offering vehicles equipped with an optional four-wheel drive system. Typically, a two-wheel drive vehicle includes a non-driving axle assembly which differs greatly from the driving axle assembly used in a similar four-wheel drive vehicle. Not only does the driving axle include the additional requisite power transmission components, but the axle housing itself is also typically very different. Because the non-driving and driving axle assemblies have similar but different components, the cost associated with providing both two-wheel drive and four-wheel drive vehicles may become prohibitive. Specifically, design, prototype and testing programs are required to evaluate each design. In addition, the different axle assemblies often require dedicated tools and manufacturing process steps which are individual to each type of assembly. Unfortunately, the cost of creating and using multiple sets of fixtures and tooling is very high.

While the present method of providing driving and non-driving axle assemblies is functional, a need exists to reduce the complexity and cost of offering two-wheel drive and four-wheel drive vehicles.

SUMMARY OF THE INVENTION

Thus, is it an object of the present invention to provide a modular axle assembly which may be configured to provide a non-driving front axle or a driving front axle using a large number of common components.

It is another object of the present invention to construct the modular axle assembly to include a number of standardized components to cooperate with certain interchangeable components which are unique to non-driving or driving axle assemblies.

It is another object of the present invention to provide a modular axle assembly having common axle tube and wheel end assemblies with a replaceable modular center section.

It is another object of the present invention to provide a non-driving modular axle assembly having a cast sleeve including an integral jounce pad.

The present invention includes a modular axle assembly having a first tube assembly and a second tube assembly interconnected by a center section. A number of different modular axle assemblies are constructed by using different center sections. For example, a non-driving axle includes a sleeve interconnecting first and second tube assemblies. A driving front axle includes a differential housing interconnecting the first and second tube assemblies.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
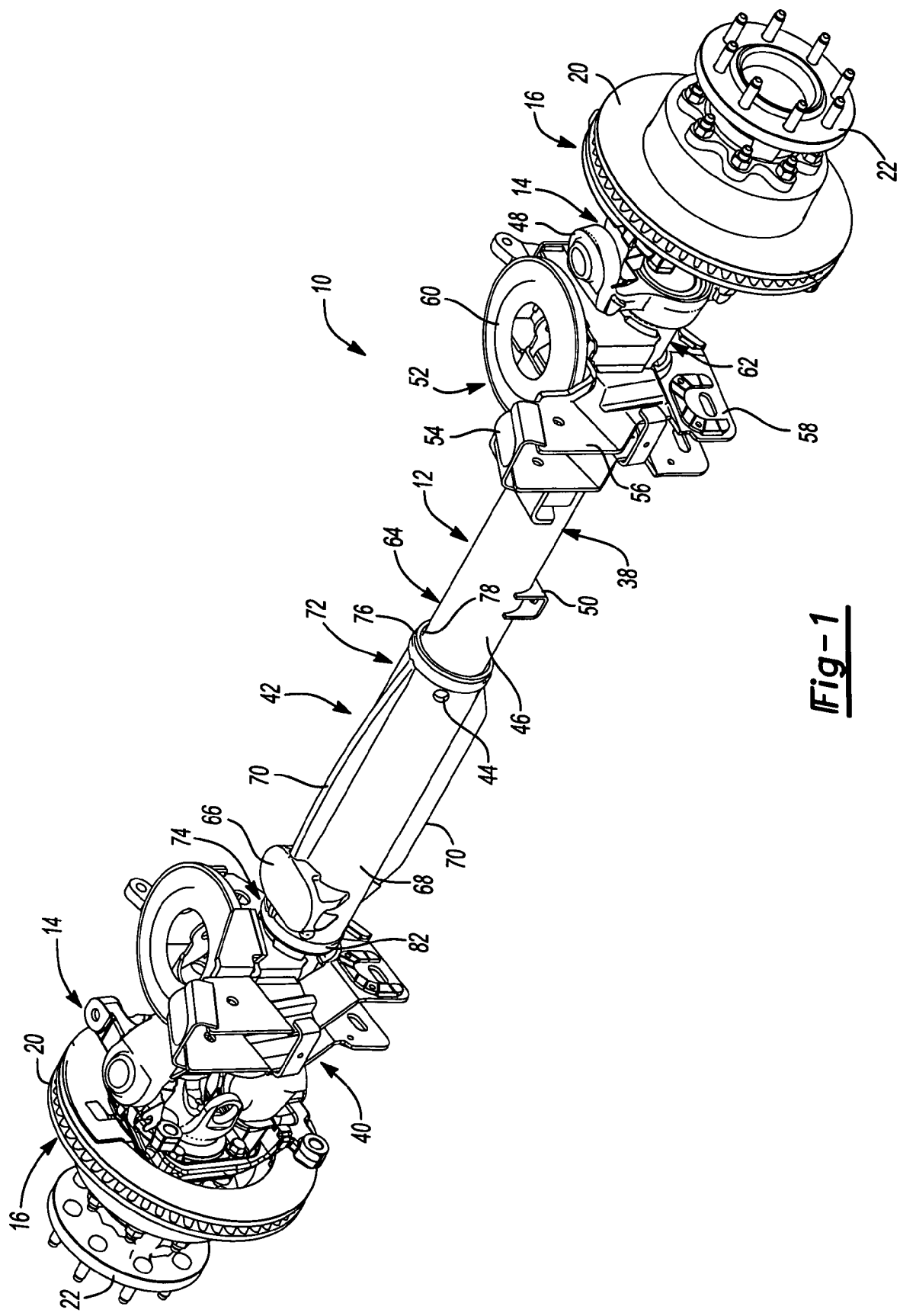
FIG. 1 is a perspective view of a modular non-driving front axle constructed in accordance with the teachings of the present invention.
Figure 2:
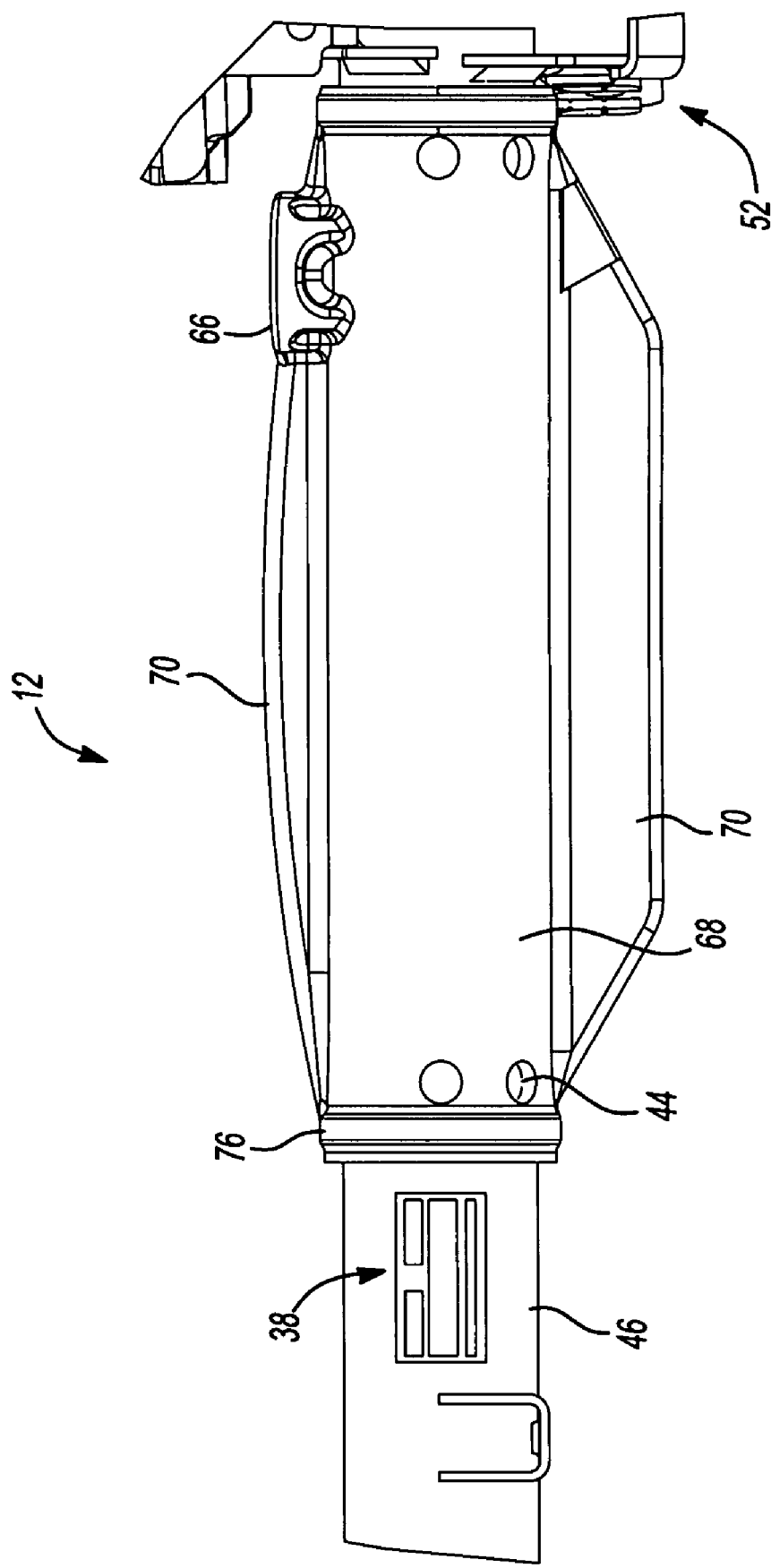
FIG. 2 is a fragmentary front view of the modular non-driving front axle of FIG. 1.

With reference to FIGS. 1 and 2, a modular axle assembly 10 constructed in the form of non-driving front axle is depicted. Non-driving axle 10 includes a sleeve and tube assembly 12, a pair of knuckle assemblies 14 and a pair of wheel end assemblies 16. Non-driving axle 10 functions to support a portion of the vehicle load and provide articulating wheel end assemblies for steering.

The pair of knuckle assemblies 14 and the pair of wheel end assemblies 26 are common to both the driving and non-driving versions of the modular axle assembly of the present invention. As such, reference to FIG. 4 should also be made. Each wheel end assembly 16 includes a hub 18, a brake rotor 20, a hub extension 22 and an outer shaft 24. Each of these components are free to rotate about the longitudinal axis of outer shaft 24. A hub nut 26 couples outer shaft 24 to hub 18. Various fasteners and seals that are not specifically identified complete wheel end assembly 16.

Each knuckle assembly 14 includes a steering knuckle 28 and a brake caliper 30. Knuckle assembly 14 is pivotally coupled to sleeve and tube assembly 12 by an upper ball joint 32 and a lower ball joint 34. Brake caliper 30 includes a pair of brake pads 36 positioned on each side of brake rotor 20.

Sleeve and tube assembly 12 includes a first tube assembly 38 and a second tube assembly 40 interconnected by a sleeve 42. First tube assembly 38 and second tube assembly 40 may be fixed to sleeve 42 using a number of manufacturing techniques. Preferably, the first and second tube assemblies are press-fit to sleeve 42. Alternatively, and/or additionally, the first and second tube assemblies may be welded or otherwise mechanically fastened to sleeve 42. Specifically contemplated processes include puddle welding, slug welding and riveting.

To puddle weld, a series of radially extending apertures 44 are formed in sleeve 42. Apertures 44 are at least partially filled with a meltable weld material. A current is passed through the tube assembly and the sleeve which causes the weld material to melt. Upon cooling, the weld material adheres to both the tube assembly and the sleeve.

First tube assembly 38 is substantially similar to second tube assembly 40. Accordingly, only first tube assembly 38 will be described in detail. First tube assembly 38 includes a tube 46, a yoke 48, a jounce pad 50 and a number of brackets 52 useful for interconnecting sleeve and tube assembly 12 with a number of vehicle suspension components. Specifically, brackets 52 include a roll stop 54, an upper control arm bracket 56, a lower control arm bracket 58, and a spring seat 60. Tube 46 includes a first end 62 and a second end 64. First end 62 is coupled to yoke 48. Second end 64 may be coupled to sleeve 42 as previously described or to a differential axle housing as will be described in greater detail hereinafter. Each of brackets 52 and jounce pad 50 are preferably constructed from stamped steel sheets and formed to a desired shape. The formed stampings are then welded to tube 46. Similarly, yoke 48 is preferably welded to tube 46. Alternate processes such as press-fitting, adhesive bonding or installation of mechanical fasteners are also contemplated.

Sleeve 42 is preferably a cast component requiring little or no machining prior to assembly to the first and second tube assemblies. Alternatively, sleeve 42 may be formed from tubing with brackets welded to the tube as required. In the cast embodiment shown in FIGS. 1 and 2, sleeve 42 includes integrally cast features such as a jounce pad 66 to alleviate the need for subsequent bracket welding. Sleeve 42 also includes a substantially cylindrical body 68 and a plurality of ribs 70 longitudinally extending along body 68. Body 68 includes a first end 72 and a second end 74. First end 72 has a collar 76 with an inner cylindrical surface 78 sized to engage an outer surface of tube 46. Second end 74 includes a similar collar 82 having an inner surface in engagement with an outer surface of the tube from second tube assembly 40. Sleeve 42 has an overall length which is substantially the same as the overall length of the differential housing of the driving axle depicted in FIG. 3. By constructing sleeve 42 in this manner, non-driving axle assemblies and driving axle assemblies having the same wheel to wheel spacing may be easily constructed.

Figure 3:
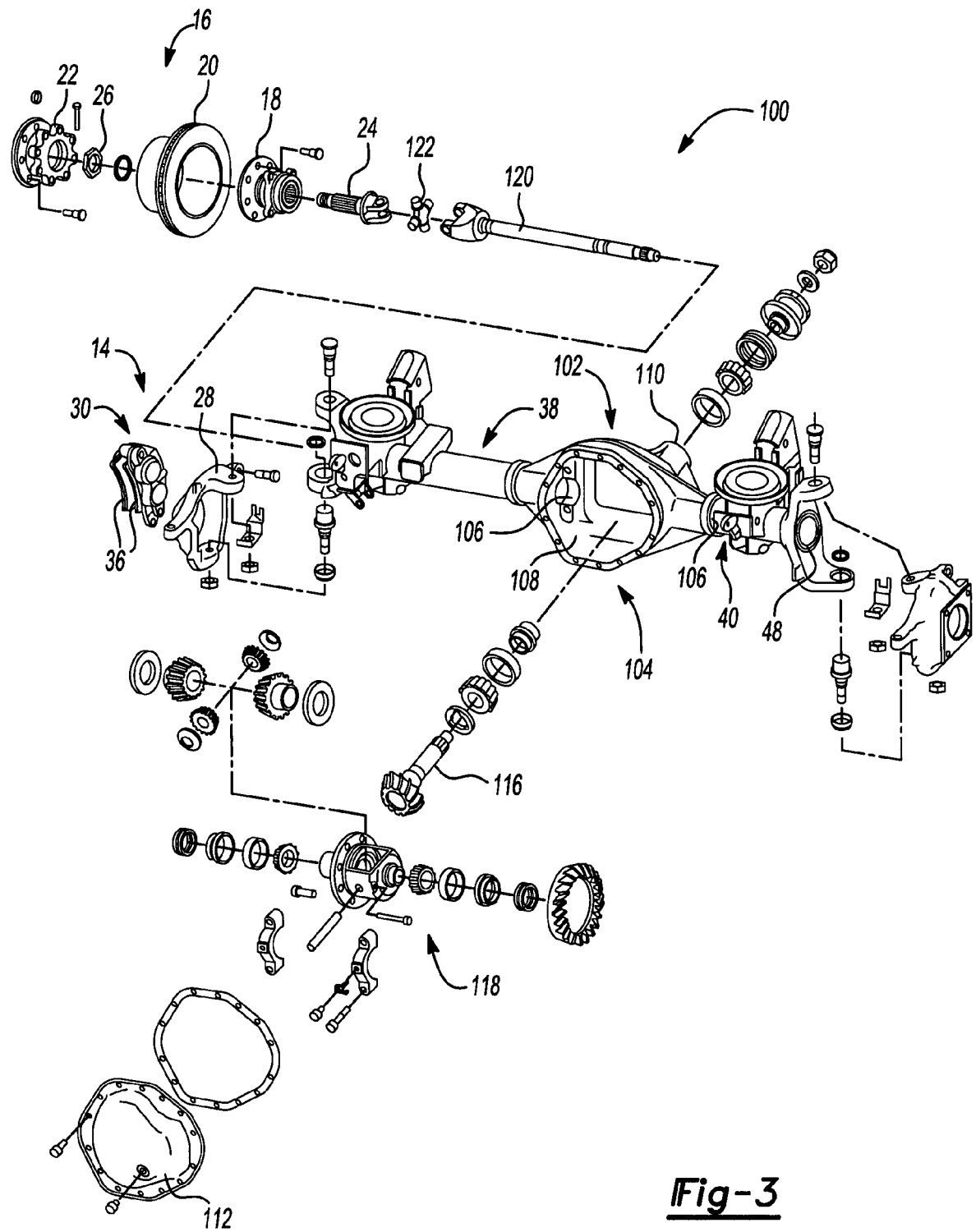
FIG. 3 is a perspective view of a modular driving axle assembly constructed in accordance with the teachings of the present invention.
Figure 4:
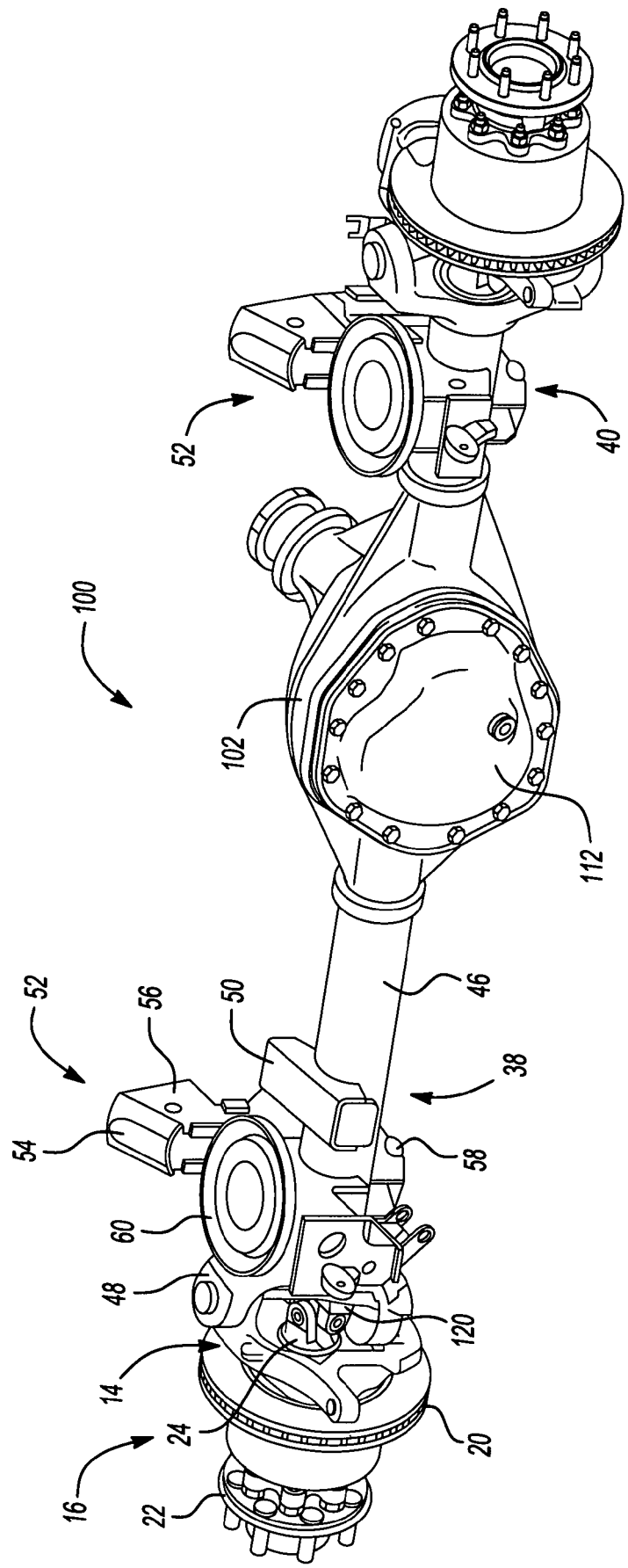
FIG. 4 is an exploded perspective view of the modular driving front axle shown in FIG. 3.

FIGS. 3 and 4 depict a modular axle assembly constructed as a driving axle 100. Driving axle 100 includes common knuckle assemblies 14, wheel end assemblies 16, first tube assembly 38 and second tube assembly 40. First tube assembly 38 and second tube assembly 40 are joined to a differential housing 102 to form a sleeve and housing assembly 104. Differential housing 102 includes a pair of axially aligned apertures 106 for receipt of first tube assembly 38 and second tube assembly 40. The first and second tube assemblies are coupled to differential housing 102 using the press-fitting, plug welding and/or mechanical fastening techniques previously described in relation to sleeve 42. It should be appreciated that because of the large number of common components and the common position of the components of the driving and non-driving axles, one set of tooling may likely be used to couple the first and second tube assemblies to the sleeve and/or the differential housing.

Differential housing 102 also includes an access opening 108 and an input shaft aperture 110. A cover 112 encloses access opening 108 after certain driveline components, introduced hereinafter, have been assembled with a cavity 114 defined by differential housing 102. Power is transferred to the wheels of driving axle 100 via an input shaft 116, a differential assembly 118 and drive shafts 120. For clarity, only one of driveshaft 120 is depicted in the Figure. Driveshaft 120 is drivingly coupled to outer shaft 24 by a universal joint 122.

From the foregoing discussion, it should be appreciated that a family of axle assemblies may be constructed using the modular concept described. Utilization of common axle tube assemblies and wheel end assemblies in driving and non-driving axles allows for manufacturing and assembly cost reductions. Furthermore, the costs associated with testing and verification of two entirely different axle assemblies are avoided.

The previous sections disclose and describe merely exemplary embodiments of the present invention. One skilled in the art will readily recognize from the discussion, and from the accompanying drawings and claims, that various changes, modifications and variations may be made therein without department from the spirit and scope of the invention as defined in the following claims.

What is claimed is:

1. A method for providing a modular axle assembly, the method comprising:
    providing a pair of axle tubes;
    providing a differential housing with a pair of attachment structures, each of the attachment structures of the differential housing being configured to be coupled to an end of one of the axle tubes;
    providing a sleeve with a pair of attachment structures, each of the attachment structures of the sleeve being configured to be coupled to the end of the one of the axle tubes;
    selecting one of the differential housing and the sleeve; and
    coupling the pair of axle tubes to the attachment structures of the one of the differential housing and the sleeve.

2. The method of claim 1, wherein the axle tubes are received in the attachment structures of the one of the differential housing and the sleeve.

3. The method of claim 2, wherein coupling the pair of axle tubes to the attachment structures of the one of the differential housing and the sleeve includes forming a weld on the axle tubes, the one of the differential housing and the sleeve, or both the axle tubes and the one of the differential housing and the sleeve.

4. The method of claim 1, wherein the one of the differential housing and the sleeve is the differential housing, and wherein the method further comprises:
    installing a differential unit in a cavity defined by the differential housing; and
    coupling a pair of axle shafts to the differential unit, each of the axle shafts being rotatably supported by a corresponding one of the axle tubes.

5. The method of claim 1, further comprising coupling a yoke to each of the axle tubes.

6. The method of claim 5, further comprising pivotally coupling a knuckle to each of the yokes.

7. A method for providing a modular axle assembly, the method comprising:
    providing two pair of axle tubes;
    providing a differential housing with a pair of attachment structures, each of the attachment structures of the differential housing being configured to be coupled to an end of one of the axle tubes;
    coupling a first pair of the axle tubes to the attachment structures of the differential housing to at least partially form a first axle assembly;
    providing a sleeve with a pair of attachment structures, each of the attachment structures of the sleeve being configured to be coupled to the end of the one of the axle tubes; and
    coupling a second pair of axle tubes to the attachment structures of the sleeve to at least partially form a second axle assembly.

8. The method of claim 7, wherein the first pair of axle tubes are received in the attachment structures of the differential housing.

9. The method of claim 8, wherein coupling the first pair of axle tubes to the attachment structures of the differential housing includes forming a weld on the first pair of axle tubes, the differential housing, or both the first pair of axle tubes and the differential housing.

10. The method of claim 8, wherein the second pair of axle tubes are received in the attachment structures of the sleeve.

11. The method of claim 10, wherein coupling the second pair of axle tubes to the attachment structures of the sleeve includes forming a weld on the second pair of axle tubes, the sleeve, or both the second pair of axle tubes and the sleeve.

12. The method of claim 7, further comprising:
  installing a differential unit in a cavity defined by the differential housing; and
  coupling a pair of axle shafts to the differential unit, each of the axle shafts being rotatably supported by a corresponding one of the first pair of axle tubes.

13. The method of claim 7, further comprising coupling a yoke to each of the first pair of axle tubes, each of the second pair of axle tubes, or each of the first and second pairs of axle tubes.

14. The method of claim 13, further comprising pivotally coupling a knuckle to each of the yokes.

* * * * *